US008719483B2

(12) United States Patent
Hidaka

(10) Patent No.: US 8,719,483 B2
(45) Date of Patent: May 6, 2014

(54) MULTI-ROOT PCI EXPRESS SWITCH, BOOT METHOD THEREOF, AND MULTI-ROOT PCI MANAGER PROGRAM

(75) Inventor: Youichi Hidaka, Tokyo (JP)

(73) Assignee: NEC Corporation, Tokyo (JP)

( * ) Notice: Subject to any disclaimer, the term of this patent is extended or adjusted under 35 U.S.C. 154(b) by 313 days.

(21) Appl. No.: 13/060,980

(22) PCT Filed: Oct. 14, 2009

(86) PCT No.: PCT/JP2009/067758
§ 371 (c)(1),
(2), (4) Date: Feb. 25, 2011

(87) PCT Pub. No.: WO2010/044409
PCT Pub. Date: Apr. 22, 2010

(65) Prior Publication Data
US 2011/0185163 A1    Jul. 28, 2011

(30) Foreign Application Priority Data
Oct. 15, 2008 (JP) ................................. 2008-266444

(51) Int. Cl.
*G06F 3/00* (2006.01)
*G06F 13/00* (2006.01)
*H05K 7/10* (2006.01)
*G06F 13/36* (2006.01)
*G06F 9/44* (2006.01)
*G06F 13/40* (2006.01)

(52) U.S. Cl.
CPC .......... *G06F 9/4411* (2013.01); *G06F 13/4081* (2013.01)
USPC .............................. 710/314; 710/10; 710/302

(58) Field of Classification Search
CPC .......................... G06F 9/4411; G06F 13/4081
USPC .................................... 710/10, 302, 314
See application file for complete search history.

(56) References Cited

U.S. PATENT DOCUMENTS 7,657,663 B2 *   2/2010   Freimuth et al. ................... 710/5
7,813,366 B2 *  10/2010   Freimuth et al. ............. 370/419
7,979,592 B1 *   7/2011   Pettey et al. ...................... 710/3
(Continued)

FOREIGN PATENT DOCUMENTS

| JP | 2001265598 A | 9/2001 |
| JP | 2008046722 A | 2/2008 |
| JP | 2008-78887 A | 4/2008 |
| JP | 2008-165776 A | 7/2008 |
| JP | 2011-516964 A | 5/2011 |
| WO | 2009/139489 A1 | 11/2009 |

OTHER PUBLICATIONS

International Search Report for PCT/JP2009/067758 mailed Jan. 19, 2010.
Multi-Root I/O Virtualization and Sharing Specification, Revision 0.9, PCI-SIG, Nov. 7, 2007, pp. 26-33.
Japanese Office Action for JP Application No. 2010-533906 mailed on Aug. 27, 2013 with Partial English Translation.

*Primary Examiner* — Henry Tsai
*Assistant Examiner* — Eric Oberly
(74) *Attorney, Agent, or Firm* — Sughrue Mion, PLLC

(57) ABSTRACT

Provided is an MRA (multi-root aware) PCI express switch accommodating a plurality of root complexes. The MRA PCI express switch includes: a setting register storing necessary information to set a PCI tree based on a switch connection topology and a physical connection state; and a virtual switch bridge controller storing necessary information to establish a virtual PCI tree, irrespective of a status of the setting register. The root complexes can be booted based on the information in the virtual switch bridge controller.

6 Claims, 19 Drawing Sheets

(56) References Cited

U.S. PATENT DOCUMENTS

| | | |
|---|---|---|
| 8,200,880 B2 | 6/2012 | Higuchi et al. |
| 8,271,604 B2 | 9/2012 | Freimuth et al. |
| 8,417,865 B2 | 4/2013 | Higuchi et al. |
| 2008/0147959 A1* | 6/2008 | Freimuth et al. .............. 711/100 |
| 2009/0276773 A1* | 11/2009 | Brown et al. ..................... 718/1 |
| 2011/0029693 A1 | 2/2011 | Brinkmann et al. |
| 2011/0064089 A1 | 3/2011 | Hidaka et al. |

* cited by examiner

SETTING REGISTER 5121

| VIRTUAL PCI EXPRESS SWITCH NUMBER | SWITCH PORT 1 USE PORT NUMBER, USE VH NUMBER, AND UP/DN SETTING | SWITCH PORT 2 USE PORT NUMBER, USE VH NUMBER, AND UP/DN SETTING | SWITCH PORT 3 USE PORT NUMBER, USE VH NUMBER, AND UP/DN SETTING | SWITCH PORT 4 USE PORT NUMBER, USE VH NUMBER, AND UP/DN SETTING | ... | SWITCH PORT m USE PORT NUMBER, USE VH NUMBER, AND UP/DN SETTING |
|---|---|---|---|---|---|---|
| 1 | Port1,VH0,UP | Port3,VH0,DN | Port4,N/A,DN | Port6,VH0,DN | | |
| 2 | Port2,N/A,UP | Port3,VH1,DN | Port5,N/A,DN | | | |
| 3 | Port6,VH1,UP | Port3,VH2,DN | | | | |
| ... | | | | | | |
| n | | | | | | |

FIG. 5

SETTING REGISTER 5131

| VIRTUAL PCI EXPRESS SWITCH NUMBER | SWITCH PORT 1 USE PORT NUMBER, USE VH NUMBER, AND UP/DN SETTING | SWITCH PORT 2 USE PORT NUMBER, USE VH NUMBER, AND UP/DN SETTING | SWITCH PORT 3 USE PORT NUMBER, USE VH NUMBER, AND UP/DN SETTING | SWITCH PORT 4 USE PORT NUMBER, USE VH NUMBER, AND UP/DN SETTING | ... | SWITCH PORT m USE PORT NUMBER, USE VH NUMBER, AND UP/DN SETTING |
|---|---|---|---|---|---|---|
| 1 | Port1,N/A,UP | Port2,VH1,DN | Port3,VH1,DN | | | |
| 2 | Port2,VH0,DN | Port3,VH0,UP | | | | |
| 3 | | | | | | |
| ... | | | | | | |
| n | | | | | | |

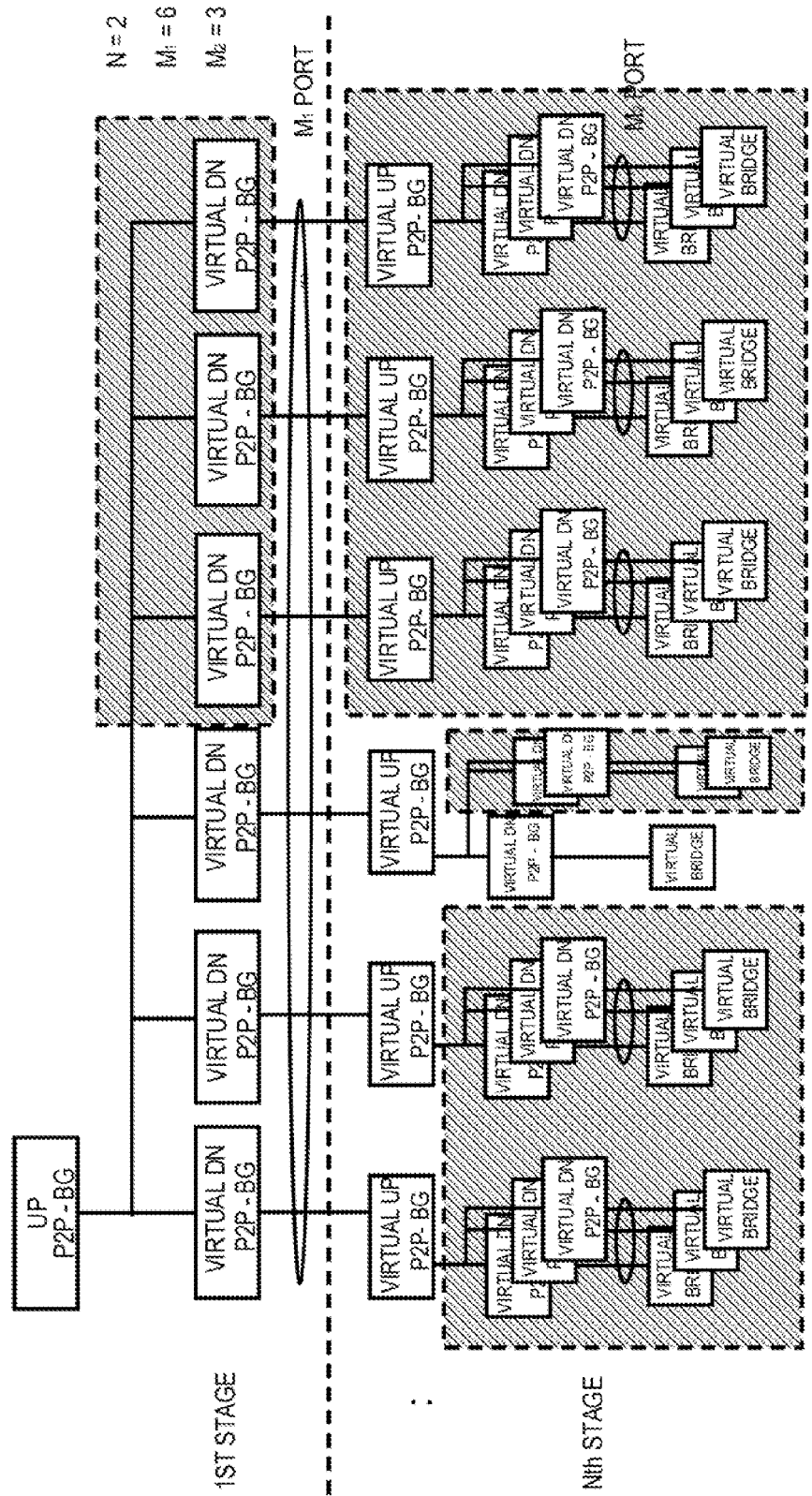

MULTI-ROOT PCI EXPRESS SWITCH, BOOT METHOD THEREOF, AND MULTI-ROOT PCI MANAGER PROGRAM

REFERENCE TO RELATED APPLICATION

The present invention is the National Phase of PCT/JP2009/067758, filed Oct. 14, 2009, which is based upon and claims the benefit of the priority of Japanese patent application No. 2008-266444, filed on Oct. 15, 2008, the disclosure of which is incorporated herein in its entirety by reference thereto.

TECHNICAL FIELD

The present invention relates to a PCI express switch extending a PCI express interface of a computing device and a networking device used in a computer apparatus and a network apparatus. In particular, the present invention relates to an MRA (multi-root aware) PCI express switch connecting a plurality of computers, a boot method thereof, and a multi-root PCI manager program thereof.

BACKGROUND

Peripheral component interconnect (PCI) is widely used as a bus standard connecting computing devices such as central processing units (CPUs), hard disks, and graphics controllers and networking devices such as forwarding engines and network controllers. As a next-generation standard of this PCI, PCI express, which uses serial buses, instead of parallel buses used in the PCI, and which executes communication in packet format, has been standardized.

Non-Patent Document 1 discloses a method of connecting a plurality of CPUs on a system including such PCI express switch. FIG. 1 illustrates a system configuration realized by Non-Patent Document 1, and FIGS. 2 and 3 illustrate configurations of MRA (multi-root aware) PCI express switches proposed by Non-Patent Document 1. As illustrated in FIG. 1, the system using the MRA PCI express switches requires a multi-root PCI manager software MR-PCIM 52 on one of the CPUs connected to the switches to manage configuration states of the switches.

Further, MR end points 505 and 506, which are I/O devices accommodating access from a plurality of root complexes, can be connected to the MRA PCI express switches. The multi-root PCI manager sets the MRA PCI express switches, so that a plurality of root complexes can be connected to each other and can access the MR end point devices. Configurations of the MRA PCI express switches and an outline of a system operation will be hereinafter described. FIG. 1 illustrates a system configuration using two MRA PCI express switches. FIGS. 2 and 3 illustrate internal configurations of MRA PCI express switches 511 and 512, respectively.

To accommodate a plurality of root complexes and an MR end point, the MRA PCI express switch 511 includes: PCI-PCI bridges 5111, 5112, 5122, and 5113 to 5115 different from a conventional PCI express switch; virtual PCI express switches 5116 to 5119 each executing switch processing between bridges; an MRA controller logic 5120 set and controlled by the MR-PCIM 52; and a setting register 5121 storing setting information about the MRA controller logic 5120.

Likewise, the MRA PCI express switch 512, which is another MRA PCI express switch used to extend the number of connection ports, includes: PCI-PCI bridges 5123, 5124, and 5133 different from a conventional PCI express switch; virtual PCI express switches 5126, 5127, and 5129 each executing switch processing between bridges; an MRA controller logic 5120 set and controlled by the MR-PCIM 52; and a setting register 5131 storing setting information about the MRA controller logic 5120.

As in a conventional PCI express, the MRA PCI express switch establishes a tree for each of the plurality of root complexes. Thus, VH (virtual hierarchy) numbers need to be allocated to determine a virtual PCI express switch and a plurality of PCI-PCI bridges to be used by each of the root complexes. Since switch processing is executed per virtual PCI express switch, virtual PCI express switches do not interfere with each other.

Further, VH numbers are allocated to the MR-aware PCI-PCI bridges, and a plurality of PCI-PCI bridges are connected to a single link. Credit control or configuration information is managed separately based on different VH numbers, and a single port indicates a plurality of PCI-PCI bridge use numbers.

The MR-PCIM executes the allocation by setting the setting register storing control information about the MRA controller logic. FIGS. 4 and 5 illustrate configuration examples of the setting registers 5121 and 5131 of the MRA PCI express switches 511 and 512, respectively. Based on this configuration, the MR-PCIM is connected to a port 1 connected to the CPU 101 and the root complex 102. Since the MRA PCI express switches are set by the MR-PCIM, paths of the VH number 0 are used by the MR PCI-PCI bridges.

Next, the setting information stored in the setting registers will be described. Each of the setting registers stores virtual PCI express switch numbers and information forming each of the virtual PCI express switches. Namely, for each of the ports, the setting register stores a switch port use number, a use VH number, and UP/Down: DN information indicating an upstream PCI-PCI bridge or a downstream PCI-PCI bridge. In the setting register 5121, the virtual PCI express switch 1 5116 has a switch number 1 and is connected to: the port 1 (a VH number VH0 and an upstream PCI-PCI bridge UP); a port 3 (VH0 and DN); a port 4 (no VH number N/A treated as a normal PCIe port); and a port 6 (VH0 and DN). Namely, based on the setting information, the root complex 102 can access the MR-aware upstream PCI-PCI bridge 5111, the virtual PCI express switch 1 5116, the MR-aware downstream PCI-PCI bridge 5113, the MR end point 505, the downstream PCI-PCI bridge 5114, the end point 106, and the MR-aware downstream PCI-PCI bridge 5122.

Access beyond the MR-aware upstream/downstream PCI-PCI bridge 5122 can be made by setting the setting register 5131 of the MRA PCI express switch 512. Based on the setting register 5131, the virtual PCI express switch 2 5127 is connected to a port 2 (VH0 and DN) and the port 3 (VH0 and UP). Beyond the MR-aware upstream/downstream PCI-PCI bridge 5122, the root complex 102 can access the MR-aware upstream/downstream PCI-PCI bridge 5124, the virtual PCI express switch 2 5127, the MR-aware downstream PCI-PCI bridge 5133, and the MR end point 506.

Likewise, the virtual PCI express switch 2 5117 and the virtual PCI express switch 3 5118 of the setting register 5121 and the virtual PCI express switch 1 5126 of the setting register 5131 are set as illustrated in FIGS. 4 and 5. Based on these settings, PCI trees that include I/O devices and that are illustrated in FIGS. 6 and 7 are established for the CPUs 101 and 101I, respectively.

[Non-Patent Document I] Multi-Root I/O Virtualization and Sharing Specification Revision 0.9, PCI-SIG, Nov. 7, 2007, pp. 26-33

SUMMARY

The entire disclosure of the above Non-Patent Document 1 is incorporated herein by reference thereto. The following analyses are given by the present invention.

According to the analyses by the present invention, a system using the above conventional MRA PCI express switch has a problem as described below.

Namely, based on the MRA PCI express switch, unless the MR-PCIM sets the setting register in view of a switch connection status and a logic connection status, a PCI tree cannot be established. Thus, no root complex can be booted until the MR-PCIM completes the processing. As a result, depending on the system scale, much time is required to boot a root complex system, thereby significantly decreasing the system operability.

The above problem will be described with reference to the drawings. FIG. 8 illustrates a sequence of the MR-PCIM 52. After booted, the MR-PCIM first grasps the type and the number of switches as well as the number of links of each switch (step S1). The MR-PCIM can grasp the numbers simply by referring to switch registers.

Next, the MR-PCIM 52 needs to grasp a switch connection topology and a physical connection status (step S2). The MR-PCIM 52 executes this operation by checking whether the topology includes loops, for example. Thus, depending on the scale or the topology configuration, the operation requires time. Next, the MR-PCIM 52 determines whether any I/Os are connected beyond the topology, and if any I/Os are connected, the MR-PCIM 52 grasps the types of the I/Os (step S3). This operation also requires time depending on the number of the I/Os. Next, the MR-PCIM 52 completes settings desired by the user, namely, the MR-PCIM 52 sets the table information illustrated in FIGS. 4 and 5 (step S4). Finally, the MR-PCIM 52 allows root complexes to use the switches (step S5). In this way, the CPUs 101 and 1011 can be booted.

FIG. 9 illustrates a boot sequence of the root complexes connected to the CPUs 101 and 1011. The sequence is executed in view of the operations of the MR-PCIM of FIG. 8. Since the root complexes wait until the MR-PCIM grasps the connection status (step S11) and the types of the I/Os (step S12), depending on the system scale or configuration, these operations require much time. Next, after the MR-PCIM completes tree settings (step S13) and issues a permission (step S14), the root complexes are finally reset to boot the BIOS (step S15).

While the BIOS is being booted, PCI tree information set by the MR-PCIM is recognized (step S16), and configuration registers 1502 of FIG. 10 included in the PCI-PCI bridges included in the PCI trees are set one by one. Each of the configuration registers includes a bus number lower limit 18001, a bus number upper limit 18002, a 32-bit I/O address lower limit 18003, a 32-bit I/O address upper limit 18004, a 32-bit memory lower limit 18005, a 32-bit memory upper limit 18006, a 64-bit memory lower limit 18007, and a 64-bit memory upper limit 18008. During data transfer, a packet forwarding logic 18009 refers to the table information and uses the information for routing.

After the bus number settings are completed, the information is supplied to the OS, and the OS starts to be booted (step S17). While the OS is being booted, drivers of the I/Os present on the set PCI trees are processed and configurations are executed. When the OS is finally booted, software can be made available (step S18).

Thus, until the software is made available, all the root complexes using an MRA PCI express switch need to wait because of the boot sequence of the MR-PCIM. In addition, until the BIOS and OS are booted, additional waiting time is required. Therefore, much time is required to boot the system, resulting in a significant decrease in system operability. In addition, since the MR-PCIM issues a boot permission to root complexes at different timings depending on the system scale, system reset and power supply management are made complex.

It is an object of the present invention to provide an MRA PCI express switch accommodating a plurality of root complexes. Based on the MRA PCI express switch, irrespective of the system scale, the root complexes can be booted without waiting time. Thus, the system operability is improved.

According to a first aspect of the present invention, there is provided a multi-root PCI express switch connectable to a plurality of root complexes. The multi-root PCI express switch includes: a setting register storing necessary information to set a PCI tree based on a switch connection topology and a physical connection status; and a virtual switch bridge controller storing necessary information to establish a virtual PCI tree, irrespective of a status of the setting register.

In addition, according to a second aspect of the present invention, there is provided a boot method of a multi-root PCI express switch connected to a plurality of root complexes. The boot method includes: when a system is booted, setting necessary information to establish a virtual PCI tree based on information regarding the number of switches included in the system and the number of links of the switches in the multi-root PCI express switch; booting a BIOS system based on the set information and establishing a virtual PCI tree; and checking a connection topology of the switch to check a connection status and replacing the virtual PCI tree with a real PCI tree.

According to a third aspect of the present invention, there is provided a multi-root PCI manager program causing a computer to manage a multi-root PCI express switch connected to a plurality of root complexes. The multi-root PCI manager program includes: when a system is booted, setting necessary information to establish a virtual PCI tree based on information regarding the number of switches included in the multi-root PCI express switch and the number of links of the switches in the multi-root PCI express switch; giving permission for use of the multi-root PCI express switch to the root complexes based on the set information; and checking a connection topology and a physical connection status of the multi-root PCI express switch and setting necessary information to establish a real PCI tree in the multi-root PCI express switch.

Based on the multi-root aware PCI express switch according to the present invention, when the system is booted, root complexes can be booted without having to wait until a connection topology or a physical connection status is grasped. Thus, the system boot time can be shortened. This is because, since root complexes can be booted based on a virtual PCI tree established before the connection topology or the physical connection status is grasped.

Further, based on the multi-root aware PCI express switch according to the present invention, root complexes can be booted at a constant timing, irrespective of the system scale. Thus, reset and power supply management control on the root complexes can be simplified. This is because, since the root complexes can be booted based on virtual PCI trees established before the connection topology or the physical connection status is grasped.

BRIEF DESCRIPTION OF THE DRAWINGS

FIG. 4 illustrates a configuration example of a setting register of an MRA PCI express switch.

FIG. 5 illustrates a configuration example of a setting register of an MRA PCI express switch.

FIG. 19 illustrates examples of portions deleted from a PCI tree after a setting is reflected according to an exemplary embodiment of the present invention.

PREFERRED MODES

Figure 1:
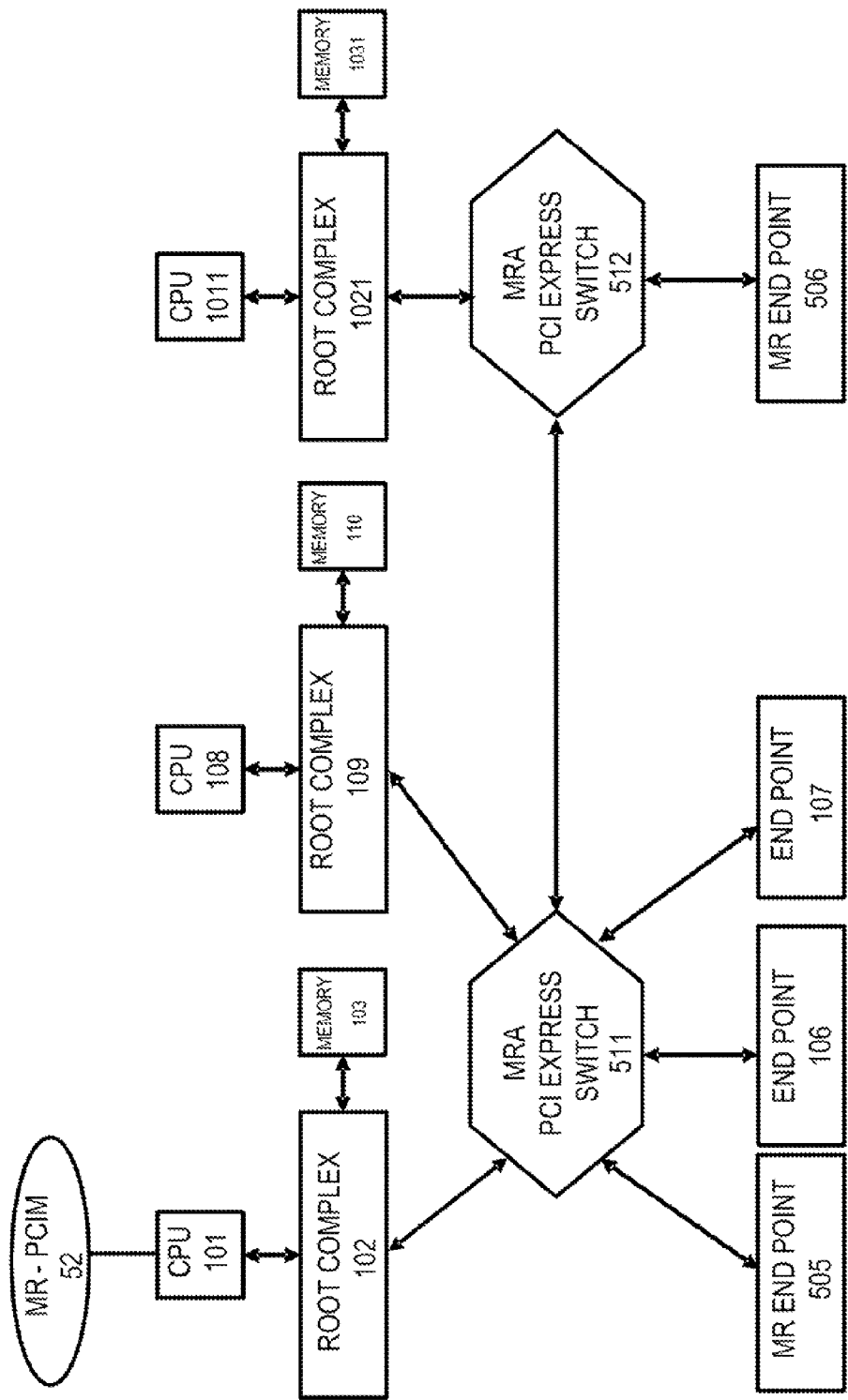
FIG. 1 illustrates a computer system using MRA PCI express switches.
Figure 2:
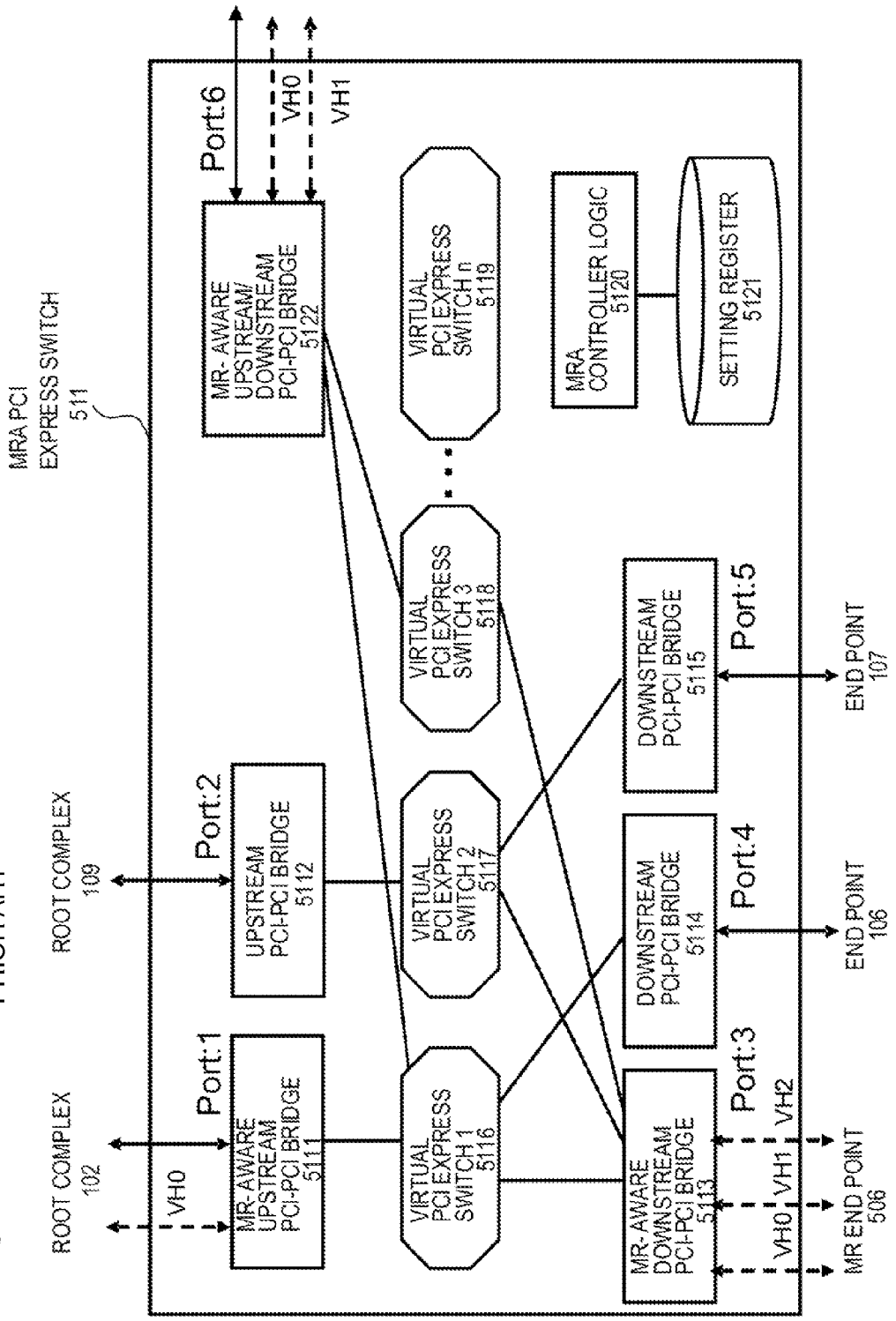
FIG. 2 illustrates an internal configuration of an MRA PCI express switch.
Figure 3:
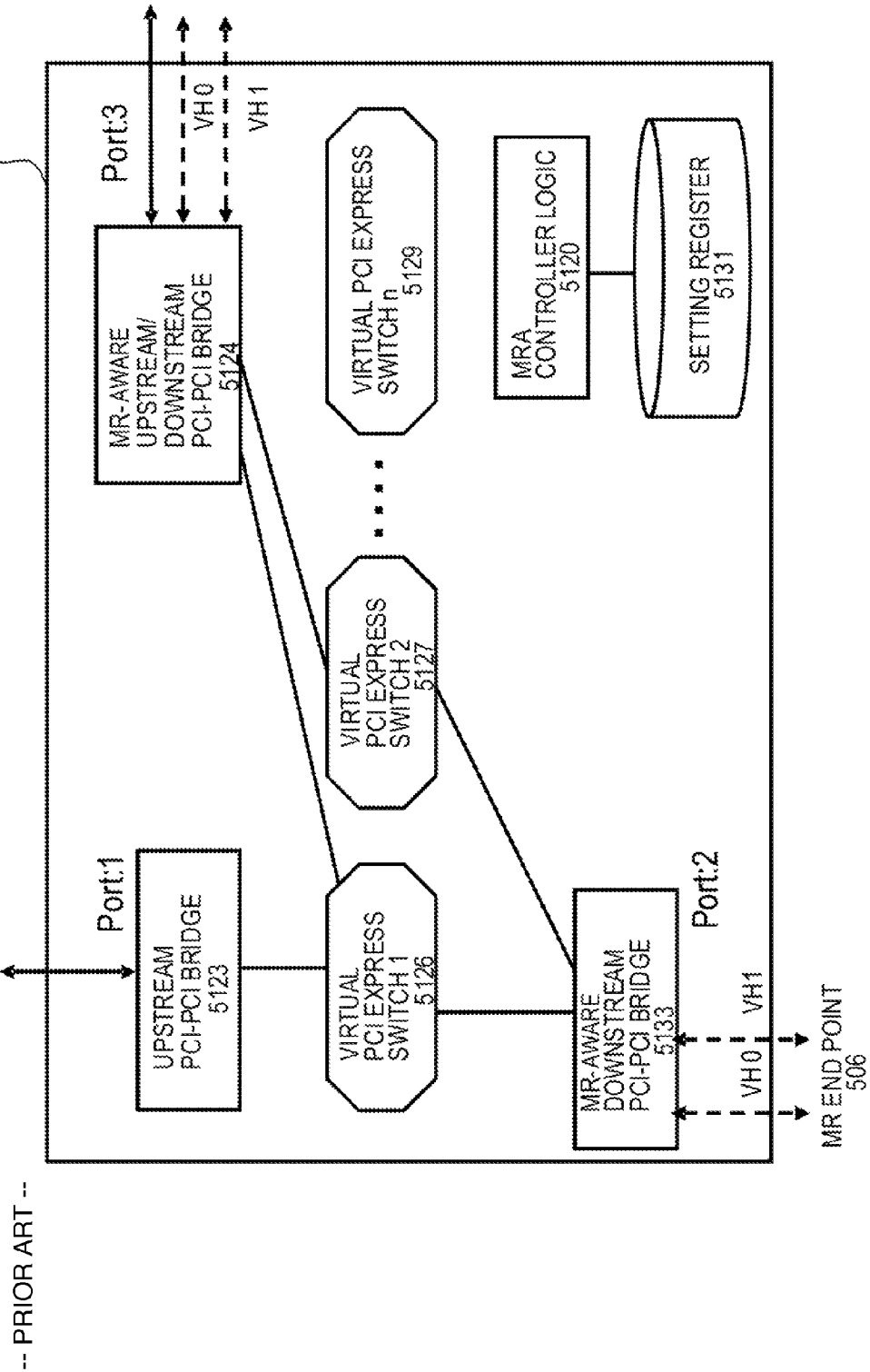
FIG. 3 illustrates an internal configuration of an MRA PCI express switch.

According to the present invention, the following preferable modes are possible.

[Mode 1]

The multi-root PCI express switch according to the first aspect is preferable.

[Mode 2]

It is preferable that the multi-root PCI express switch further include: a multi-root aware PCI-PCI bridge connectable to the plurality of root complexes; and a virtual PCI express switch arranged to correspond to the plurality of root complexes and connecting a plurality of bridges including the multi-root aware PCI-PCI bridge.

[Mode 3]

Based on the multi-root PCI express switch, it is preferable that the virtual switch bridge controller include a PCI switch bridge virtual configuration register set based on information regarding the number of switches included in a system and the number of links of the switches.

[Mode 4]

It is preferable that the multi-root PCI express switch further include a real configuration register storing address information necessary when transferring data and that the virtual switch bridge controller further include a virtual register synchronization controller executing synchronous control on the PCI switch bridge virtual configuration register and the real configuration register based on settings of the setting register.

[Mode 5]

Based on the multi-root PCT express switch, it is preferable that the virtual switch bridge controller further include a hot plug event issuing unit issuing a hot plug event to match the virtual PCI tree to a real PCI tree based on a setting state of the multi-root PCI express.

[Mode 6]

The boot method of the multi-root PCI express switch according to the second aspect is preferable.

[Mode 7]

Based on the boot method of the multi-root PCI express switch, it is preferable that the multi-root PCI express switch include a virtual switch bridge controller storing information regarding the virtual PCI tree and replacing the virtual PCI tree with a real PCI tree.

[Mode 8]

Based on the boot method of the multi-root PCI express switch, when the system is booted, it is preferable that a multi-root PCI manager program of a host computer set necessary information to establish a virtual PCI tree based on information regarding the number of switches included in the system and the number of links of the switches in the multi-root PCI express switch, that the root complexes boot a BIOS system and establish the virtual PCI tree, that, after checking the connection topology and the connection status, the multi-root PCI manager program set necessary information to establish a real PCI tree in the multi-root PCI express switch, and that the root complexes replace the virtual PCI tree with a real PCI tree, based on the information set to establish the real PCI tree.

[Mode 9]

Based on the boot method of the multi-root PCI express switch, it is preferable that the multi-root PCI manager program grasp the number of switches included in the system and the number of links of the switches by referring to a register in the multi-root PCI express switch, set necessary information to establish a virtual PCI tree, allocate fixed VH (virtual hierarchy) numbers to root complexes connected to the host computer, and give a permission for use of the switch to the root complexes connected to the host computer. In addition, it is preferable that, in response to the permission, the root complexes that have received the permission boot the BIOS system and establish a virtual PCI tree. In addition, it is preferable that the multi-root PCI manager program check the connection topology to grasp a physical connection status in parallel with the processes executed by the root complexes and determine whether any I/Os are connected. In addition, if any I/Os are connected, it is preferable that the multi-root PCI manager program grasp types of the I/Os.

[Mode 10]

Based on the boot method of the multi-root PCI express switch, it is preferable that the multi-root PCI manager program grasp the physical connection status and the types of the I/Os and that the multi-root PCI express switch issue a hot plug event depending on the setting and cause the root complexes to match the virtual PCI tree and the real PCI tree.

[Mode 11]

The multi-root PCI manager program according to the third aspect is preferable.

[Mode 12]

It is preferable that a computer-readable storage medium store the multi-root PCI manager program according to the above mode 11.

Figure 11:
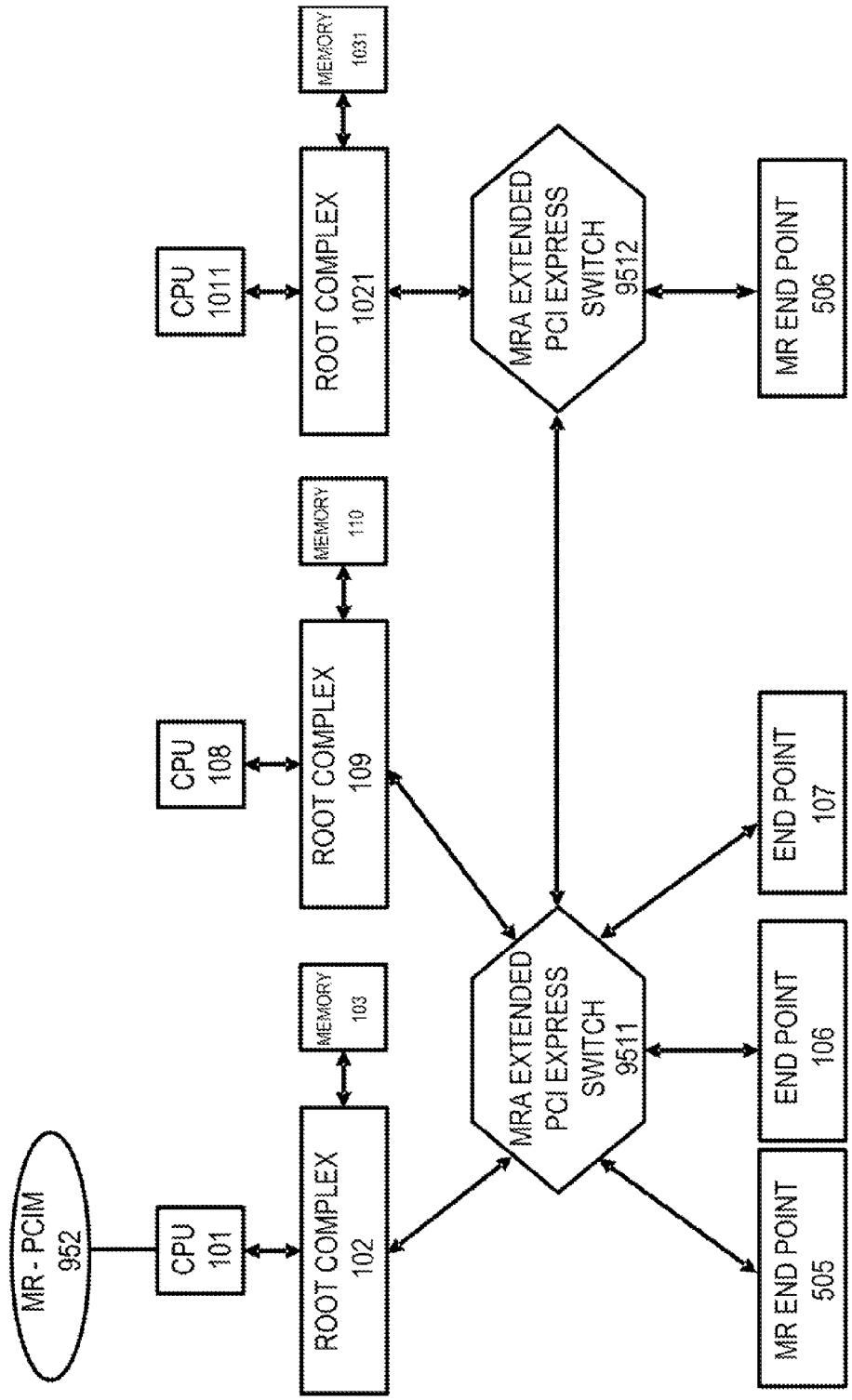
FIG. 11 illustrates an example of a computer system using MRA extended PCI express switches according to the present invention.

Next, exemplary embodiments of the present invention will be described in detail with reference to the drawings. FIG. 11 illustrates a configuration of an MRA extended PCI express system using the present invention. In the MRA PCI express system of the present invention, an MRA extended PCI express switch 9511 is connected to the CPU 101, the CPU 108, the root complex 102, the memory 103, the root complex 109, the memory 110, the MR end point 505, the end point 106, and the end point 107, which are also used in the system including the conventional MRA PCI express switch. Further, an MRA extended PCI express switch 9512 is connected to the CPU 1011, the root complex 1021, the memory 1031, and the MR end point 506. Connectable root complexes and end points are conventional PCI express-compatible devices and MR end points defined in Non-Patent Document 1, and as with the system of FIG. 1, communication can be executed between devices.

The MRA extended PCI express switch according to the present exemplary embodiment adopts a configuration similar to that of the conventional MRA PCI express switch illustrated in FIG. 1, in order to shorten the system boot time. An internal configuration, an operation, and a setting status of the MRA extended PCI express switch will be described.

Hereinafter, an internal configuration of an MRA extended PCI express switch will be described in detail. The MRA extended PCI express switch uses the upstream/downstream/MR-aware downstream PCI-PCI bridges, the MRA controller logic, and the setting register, which are also used in the MRA PCI express. In addition, the MRA extended PCI express switch includes a multi-stage virtual switch bridge controller that shows upstream/downstream PCI-PCI bridges constructing multi-stage virtual switches and PCI-PCI bridges as virtual I/Os to root complexes.

Figure 12:
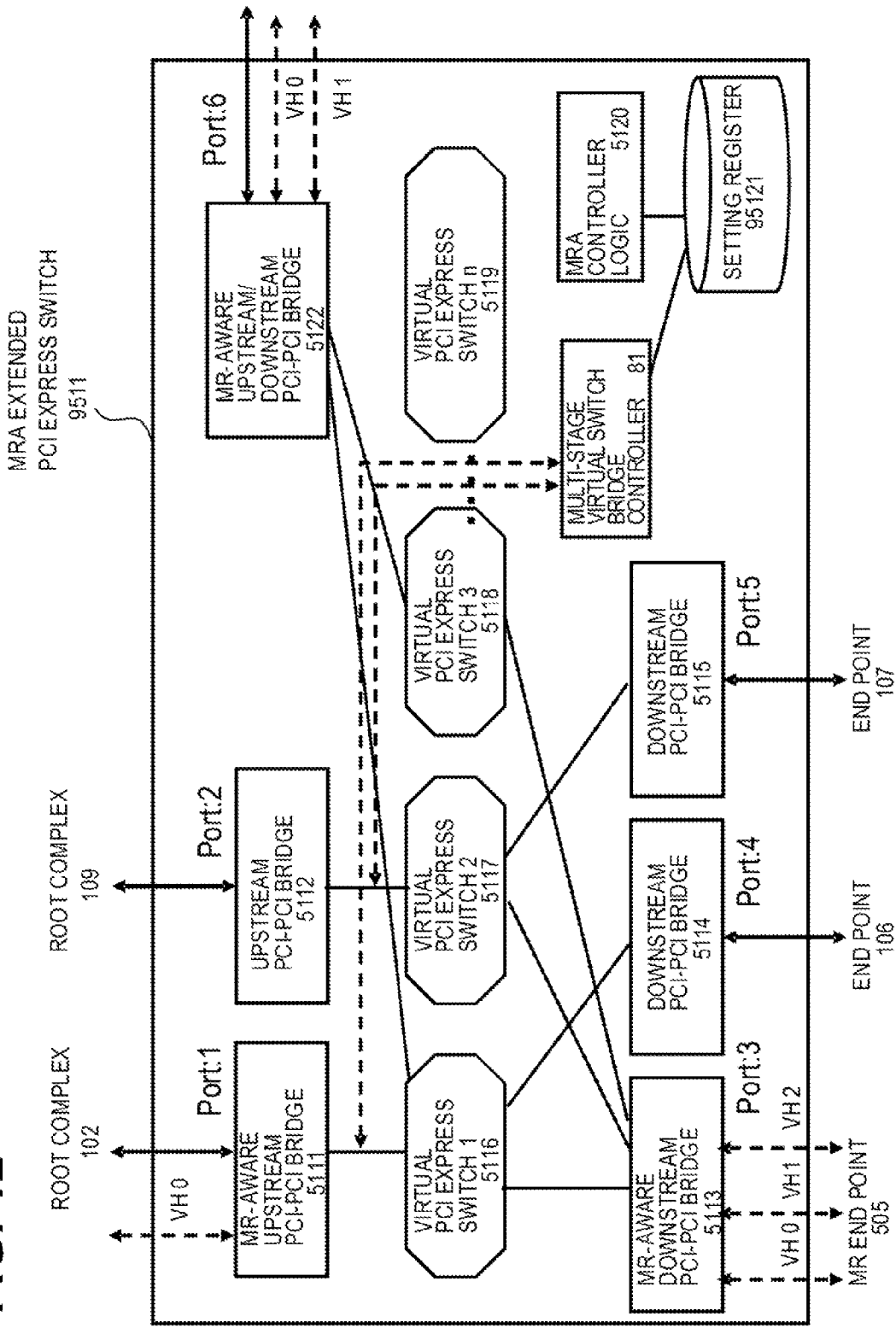
FIG. 12 illustrates an internal configuration of an MRA extended PCI express switch according to an exemplary embodiment of the present invention.
Figure 13:
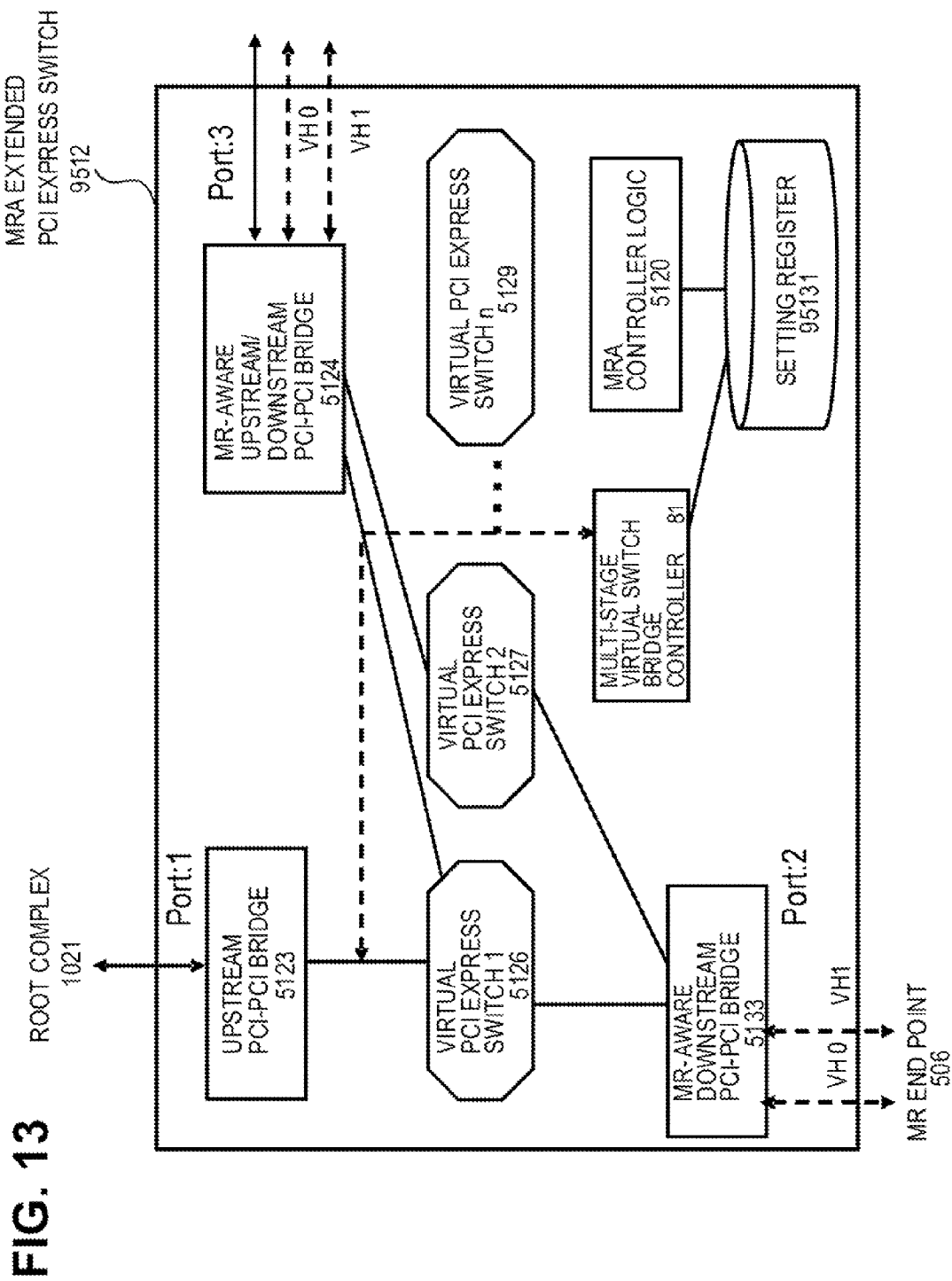
FIG. 13 illustrates an internal configuration of an MRA extended PCI express switch according to an exemplary embodiment of the present invention.

FIGS. 12 and 13 illustrate configurations of the MRA extended PCI express switches 9511 and 9512, respectively. Each of the MRA extended PCI express switches 9511 and 9512 includes a multi-stage virtual switch bridge controller 81, in addition to the components used in the conventional MRA PCI express switches 511 and 512.

As in the MRA PCI express switch, VH numbers are allocated to the MR-aware PCI-PCI bridges. Further, the MR-PCIM sets the setting register via ports of VH0 and the MRA controller logic. In this way, a virtual PCI express switch to be used, the ports and VH numbers thereof, and upstream or downstream are determined. Also, a PCI express tree is established for each root complex, whereby the end points can be accessed. Thus, data transmission processing between a root complex and an end point executed in the MRA extended PCI express switches 9511 and 9512 is carried out in a way similar to that of the conventional MRA PCI express switch.

A feature of the MRA extended PCI express switch is the multi-stage virtual switch bridge controller showing multi-stage virtual switches and bridges to root complexes. Based on the MRA extended PCI express switch 9511 of FIG. 12, for the root complexes 102 and 109, the multi-stage virtual switch bridge controller configures multi-stage virtual switches and bridges beyond the MR-aware upstream PCI-PCI bridge 5111 and the upstream PCI-PCI bridge 5112. Likewise, based on the MRA extended PCI express switch 9512 of FIG. 13, for the root complex 1021, the multi-stage virtual switch bridge controller configures virtual switches and bridges beyond the upstream PCI-PCI bridge 5123.

Figure 14:
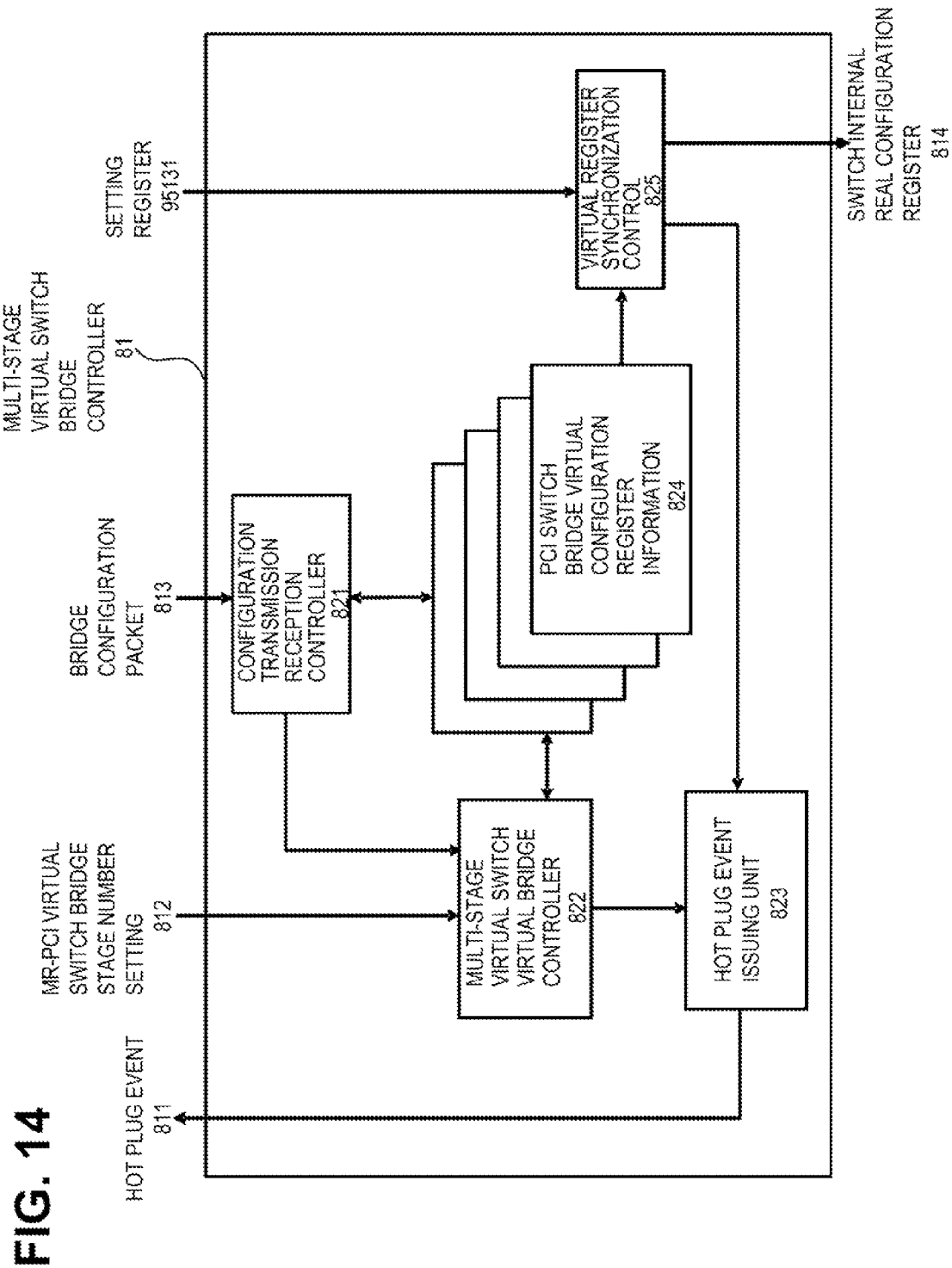
FIG. 14 illustrates a configuration of a multi-stage virtual switch bridge controller of an MRA extended PCI express switch according to an exemplary embodiment of the present invention.

FIG. 14 illustrates a detailed internal configuration of the multi-stage virtual switch bridge controller 81. The multi-stage virtual switch bridge controller 81 includes a configuration transmission reception controller 821, a multi-stage virtual switch virtual bridge controller 822, PCI switch bridge virtual configuration register information 824, a virtual register synchronization control 825, and a hot plug event issuing unit 823.

Next, functions of the multi-stage virtual switch bridge controller 81 will be described. First, when the system is booted, the MR-PCIM supplies the multi-stage virtual switch virtual bridge controller 822 of the multi-stage virtual switch bridge controller 81 with an MR-PCI virtual switch bridge stage number setting 812, which is setting information indicating the number of switch stages of the system and the number of switch links. When the stage number and the link number are set, the multi-stage virtual switch virtual bridge controller 822 configures a plurality of pieces of the PCI switch bridge virtual configuration register information 824, to show virtual upstream/downstream PCI-PCI bridges and PCI bridges to each root complex. The root complex then receives a boot permission and boots the BIOS, and a PCI tree search program runs. Next, a configuration access is generated to the MRA extended PCI express switch, and the multi-stage virtual switch bridge controller 81 receives a bridge configuration packet 813 via an upstream PCI-PCI bridge. The received information causes an access to one of the pieces of the PCI switch bridge virtual configuration register information 824.

Figure 10:
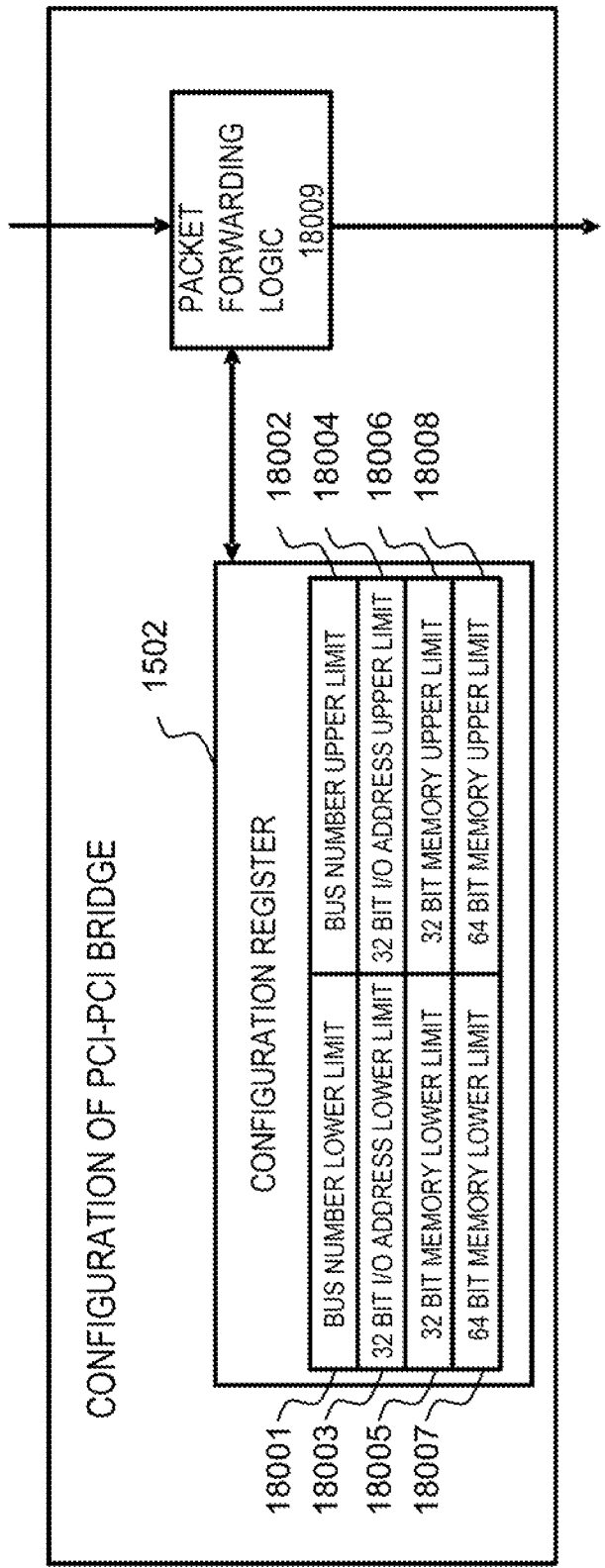
FIG. 10 illustrates a configuration of a PCI-PCI bridge.
Figure 15:
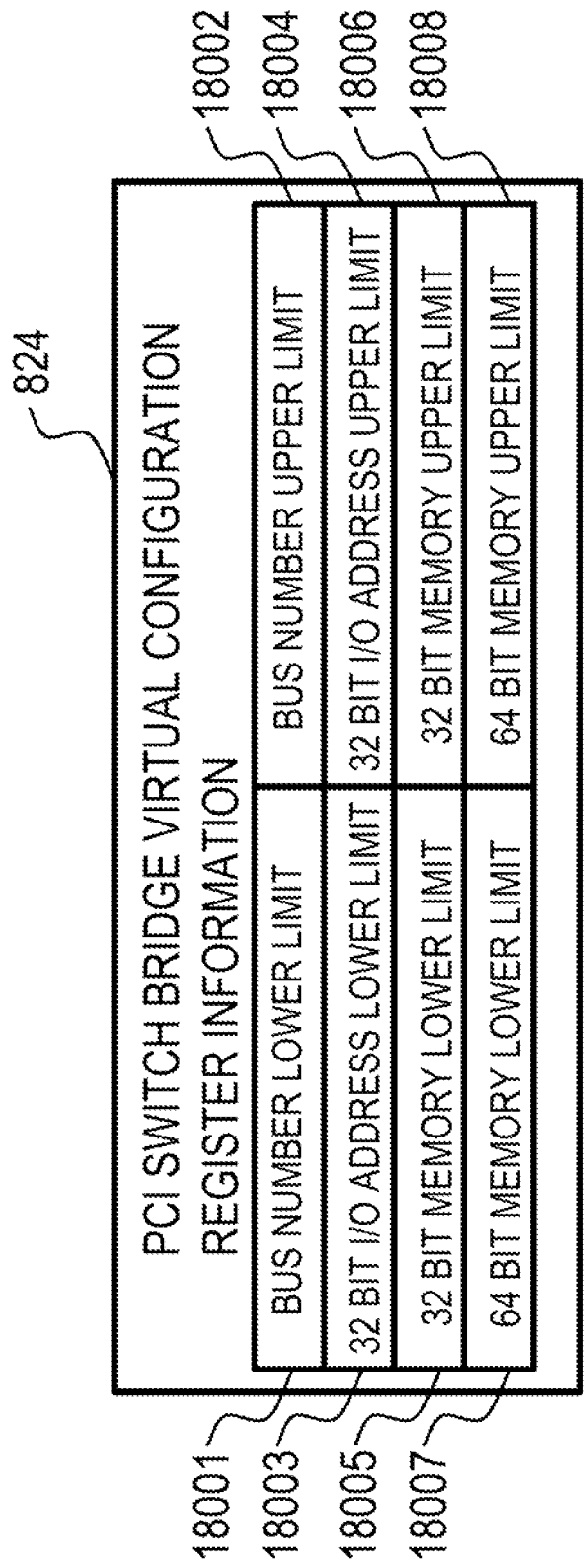
FIG. 15 illustrates a configuration example of PCI switch bridge virtual configuration register information according to an exemplary embodiment of the present invention.

FIG. 15 illustrates a detailed configuration of the PCI switch bridge virtual configuration register information 824. This register has the same configuration as the configuration register 1502 of FIG. 10 held by a real PCI-PCI bridge. Based on this register, a root complex executing configurations can view virtual PCI-PCI bridges and PCI bridges.

By referring to the setting register of the MRA extended PCI express switch, the multi-stage virtual switch bridge controller 81 grasps configuration states of real switches. When real PCI-PCI bridges are made available, the virtual register synchronization control 825 executes copying and mirroring of register information on the virtual PCI-PCI bridges corresponding to the real PCI-PCI bridges and a switch internal real configuration register 814. In this way, the virtual register synchronization control 825 executes synchronous control. When the real PCI-PCI bridges are made effective, in order to replace the virtual PCI-PCI bridges visible to the root complexes with the real PCI-PCI bridges and I/Os, the hot plug event issuing unit 823 issues hot plug events to hot-remove (separate) virtual PCI-PCI bridges and to hot-add (supply) real PCI-PCI bridges, thereby achieving consistency between the virtual state and the real use state.

Next, an operation sequence of the MR-PCIM using the MRA extended PCI express including the above multi-stage virtual switch bridge controller and a boot sequence of a root complex will be described. With these sequences, how the system boot time is shortened will be described.

Figure 16:
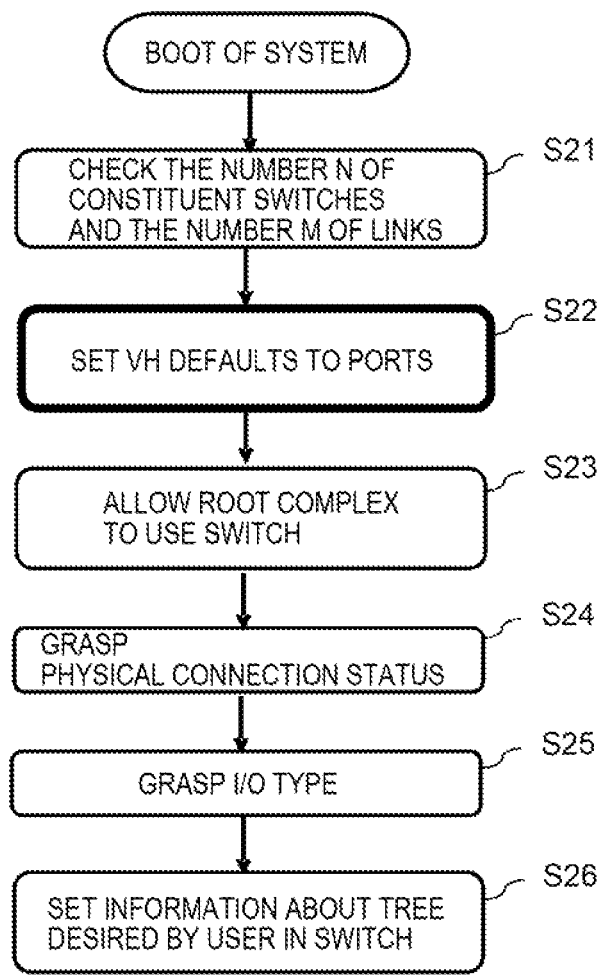
FIG. 16 illustrates an operation sequence of an MR-PCIM based on an MRA extended PCI express switch according to an exemplary embodiment of the present invention.

FIG. 16 illustrates an operation sequence of an MR-PCIM 952 managing the MRA extended PCI express switches 9511 and 9512. After booted, the MR-PCIM 952 grasps the type and the number of connected switches and the number of the links of these switches (step S21). The MR-PCIM 952 can execute this process by simply referring to registers of the switches. Next, to open paths to connect to the multi-stage virtual switch bridge controller 81, fixed VH numbers of ports to which root complexes are connected are allocated as initial values (step S22). Since links to which root complexes are connected are not shared, no problems are caused if arbitrary fixed numbers are set as VH numbers. Thereafter, the MR-PCIM allows root complexes to use switches (step S23). Irrespective of the system scale, the MR-PCIM 952 completes the checking of the number of switch stages and the number of links and setting of the initial values simply through a single command of reading/writing a register. Thus, the time required until a root complex receives a permission for use of switches is always constant and very short. After the root complex receives the permission, as in a conventional MR-PCIM, the MR-PCIM grasps a physical connect status, that is, grasps a topology indicating how switches are connected (step S24). Next, the MR-PCIM checks I/Os connected to the topology and grasps types of the I/Os (step S25). Next, settings desired by a user, namely, the table information illustrated in FIGS. 4 and 5, are set (step S26).

Figure 17:
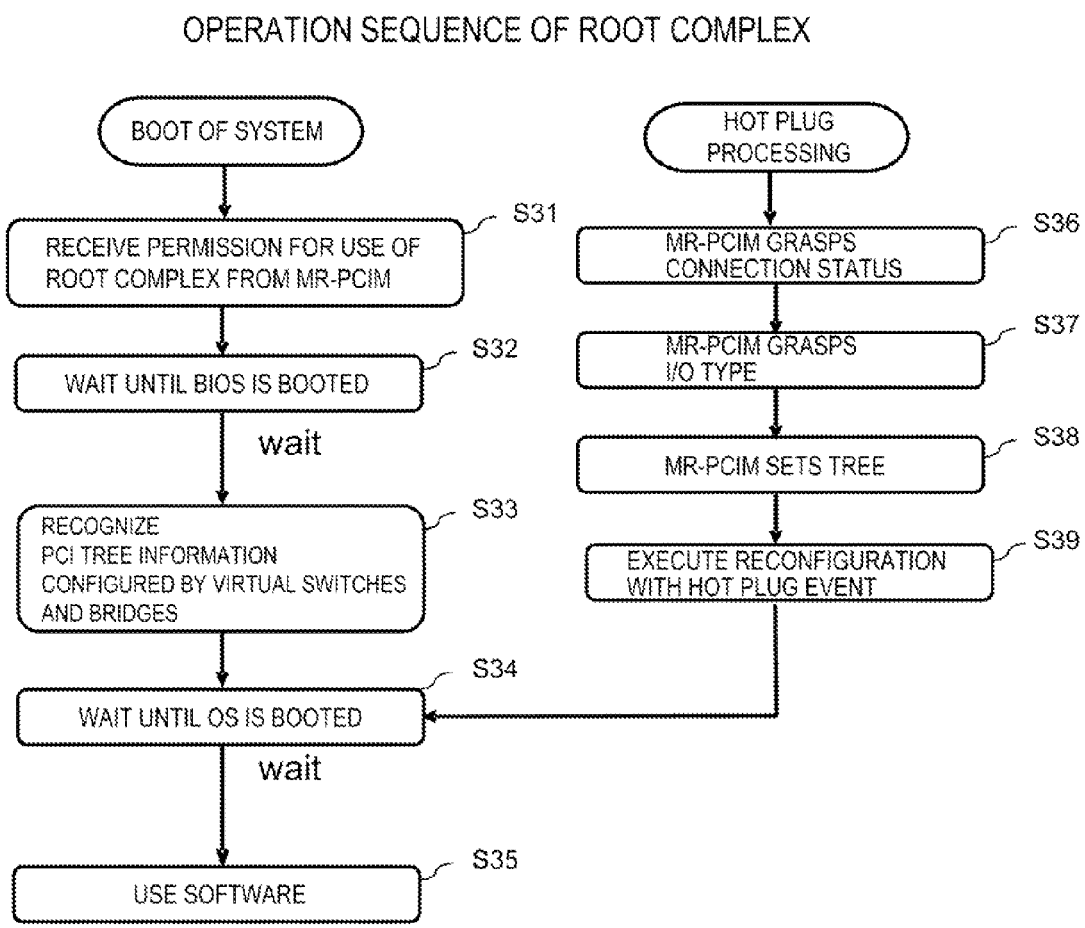
FIG. 17 illustrates an operation sequence of a root complex connected to an MRA extended PCI express switch according to an exemplary embodiment of the present invention.

FIG. 17 illustrates an operation sequence of a root complex with respect to the above operation of the MR-PCIM 952. Immediately after the system is booted, each of the root complexes on the CPUs 101 and 1011 receives a permission for use of switches from the MR-PCIM (step S31) and boots the BIOS system (step S32). Namely, irrespective of the system scale or configuration, immediately after a certain time period, that is, immediately after the MR-PCIM is booted, a boot permission is issued to the root complexes. Thus, with little waiting time, each of the root complexes can be reset and ready to boot the BIOS. While the BIOS is being booted, components beyond the upstream PCI-PCI bridges beyond the ports connected to the root complexes are not set yet by the setting registers, and therefore, the virtual PCI express switches are not used. Instead, the root complexes recognize multi-stage virtual switches and bridges provided by the multi-stage virtual switch bridge controller for booting. Regarding the multi-stage virtual switches and bridges, since the multi-stage virtual switch bridge controller has already received information about the number of stages and the number of links of the virtual switches immediately after the MR-PCIM is booted, the virtual switches and bridges have already been configured.

Figure 18:
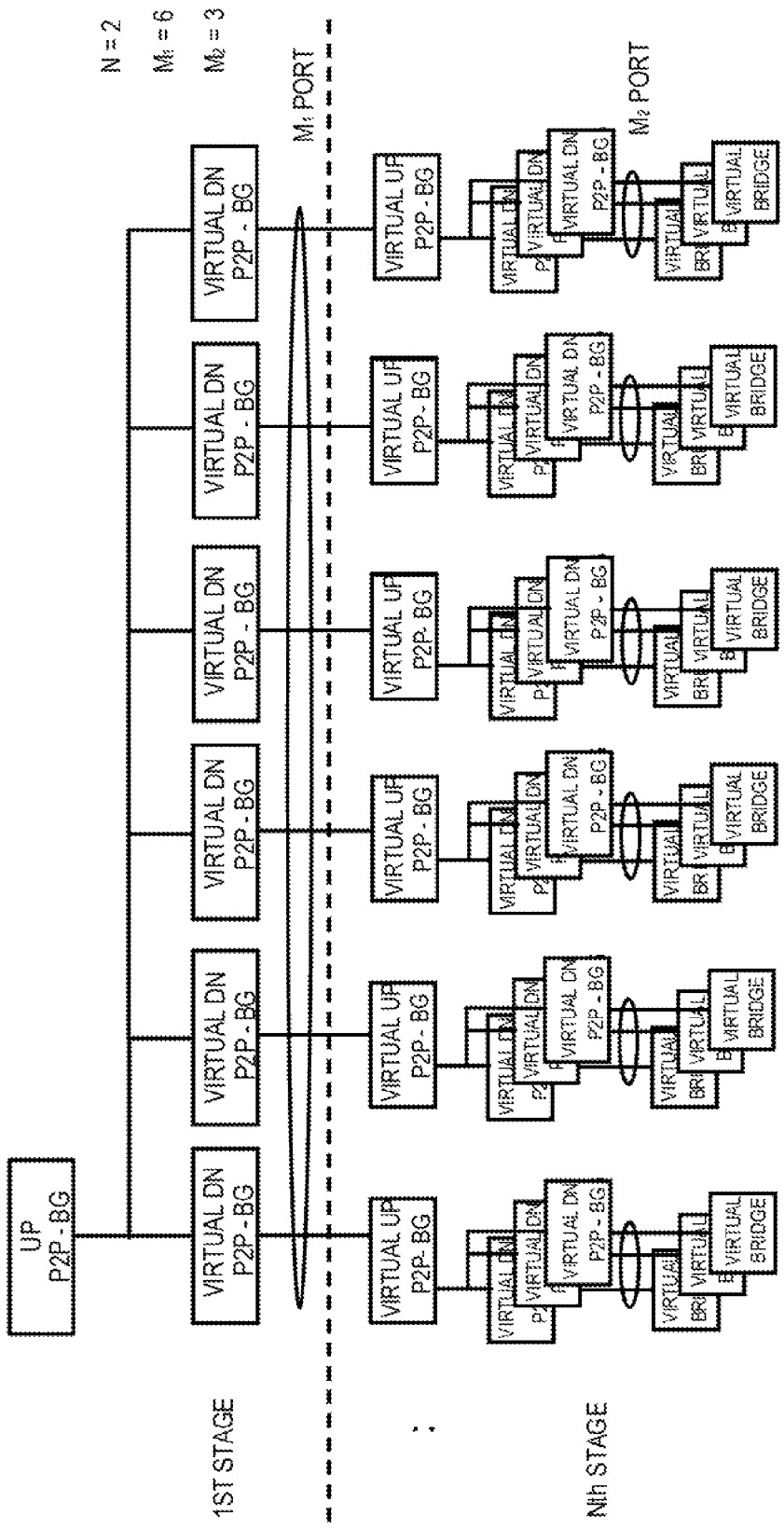
FIG. 18 illustrates an example of a PCI tree that is established based on the multi-stage virtual switch bridge controller according to an exemplary embodiment of the present invention and that is viewed from a CPU.

FIG. 18 illustrates a PCI tree of virtual switches and bridges, which is configured immediately after the MR-PCIM is booted and is viewed from the root complex 102. In FIG. 11, the number of switch stages is two, the number of links in one of the switch stages is 6, and the number of links in the other switch stage is 3. Namely, the virtual switches are formed by 2 stages (N=2), the number of links of the virtual switches in the first stage is 6 (M1=6), and the number of links of the virtual switches in the second stage is 3 (M2=3). Virtual bridges are configured at the end of each link. After the BIOS recognizes this PCI tree of virtual switches and bridges and configures the virtual switches and bridges, the OS is booted.

While the root complexes are being booted after instructed by the MR-PCIM, the MR-PCIM 952 executes the conventionally time-consuming process of grasping a physical connection status and I/O types, as illustrated in FIG. 16. Since this process is executed in parallel with the processes of booting the BIOS and OS, which are time-consuming processes executed by the root complexes, the system boot time can be shortened.

Further, upon completion of the process of grasping the physical connection status and I/O types, to set a tree, the switch setting registers are read and VS numbers are set for the VH numbers. As a result, real PCI-PCI bridges can be made available. As described above, when real PCI-PCI bridges are made available, the virtual register synchronization control 825 and the hot plug event issuing unit 823 illustrated in FIG. 14 synchronize information and execute hot plug processes to make configuration changes. In this way, the state is adjusted to a real system operation. Namely, as illustrated in steps S36 to S39 of FIG. 17, the MR-PCIM grasps the physical connection status (step S36), grasps the I/O types (step S37), and sets necessary information for setting a tree desired by the user in the setting registers (95121, 95131) (step S38). In addition, the MR-PCIM uses hot plug events to reconfigure the virtual PCI tree, so that the virtual PCI tree corresponds to the real PCI tree (step S39).

Figure 6:
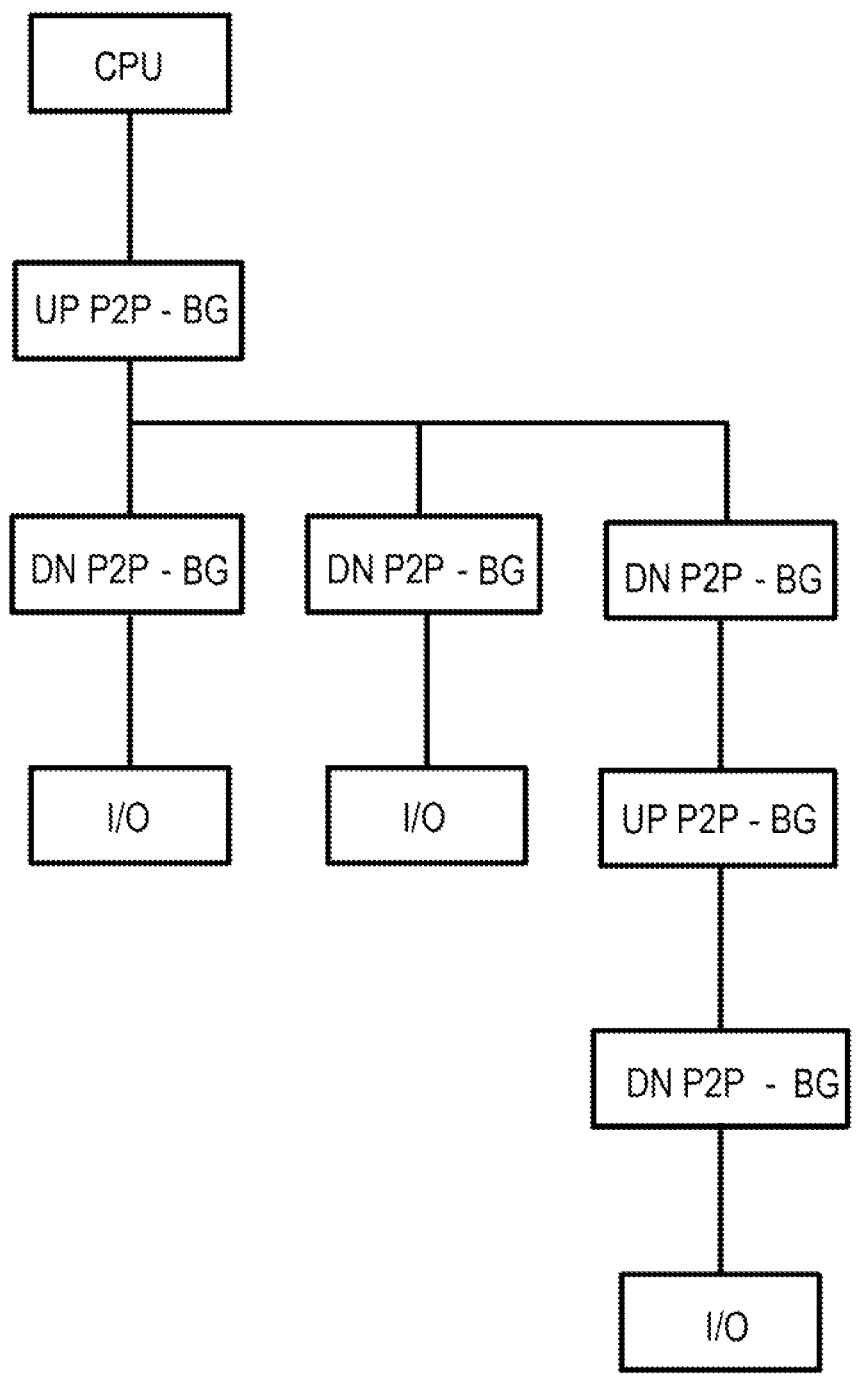
FIG. 6 illustrates a PCI tree viewed from a CPU based on the MRA PCI express switches.
Figure 7:
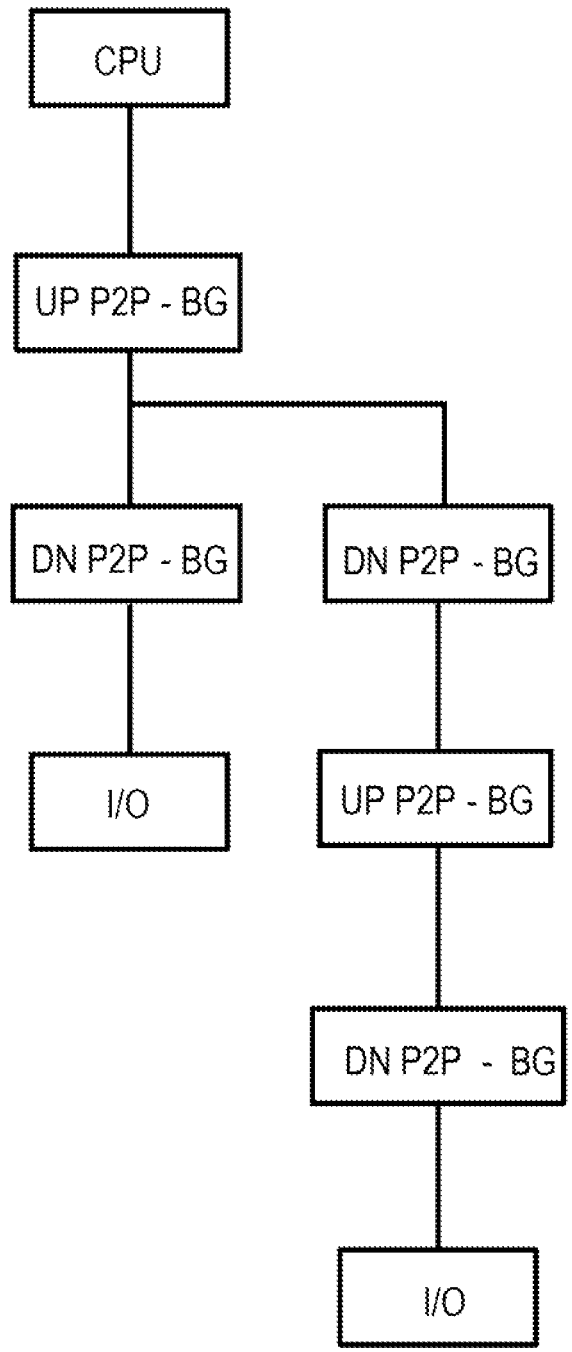
FIG. 7 illustrates a PCI tree viewed from a CPU based on the MRA PCI express switches.
Figure 8:
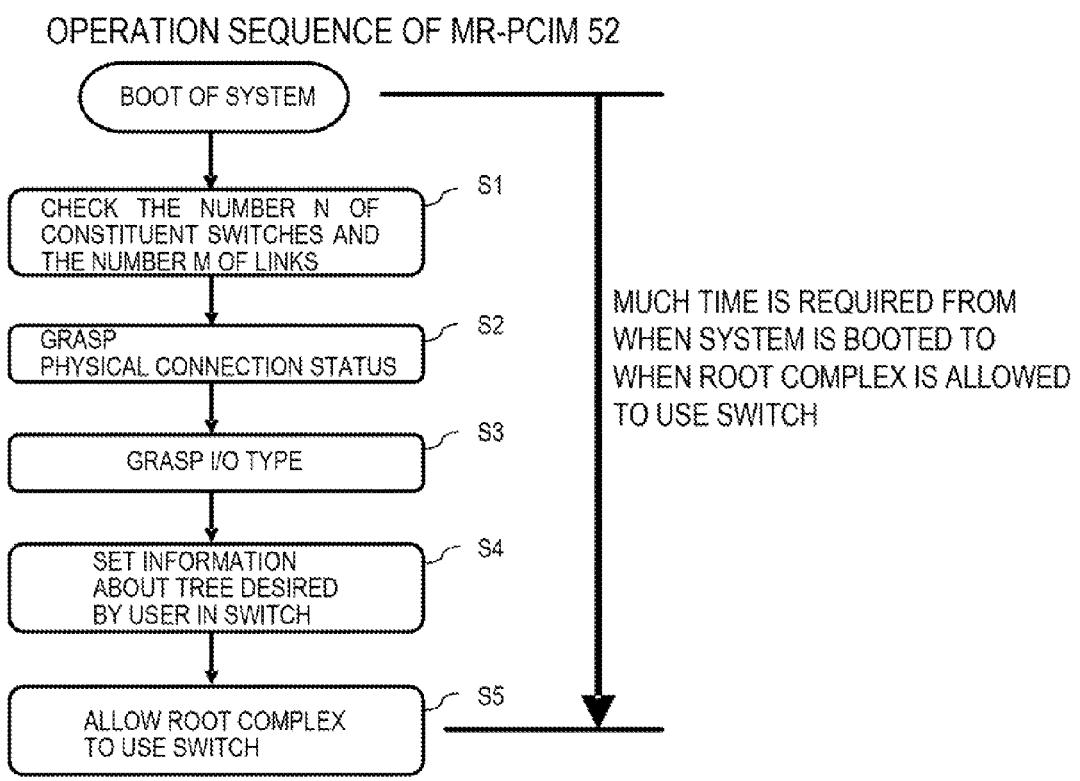
FIG. 8 illustrates a problem with an operation sequence of an MR-PCIM.
Figure 9:
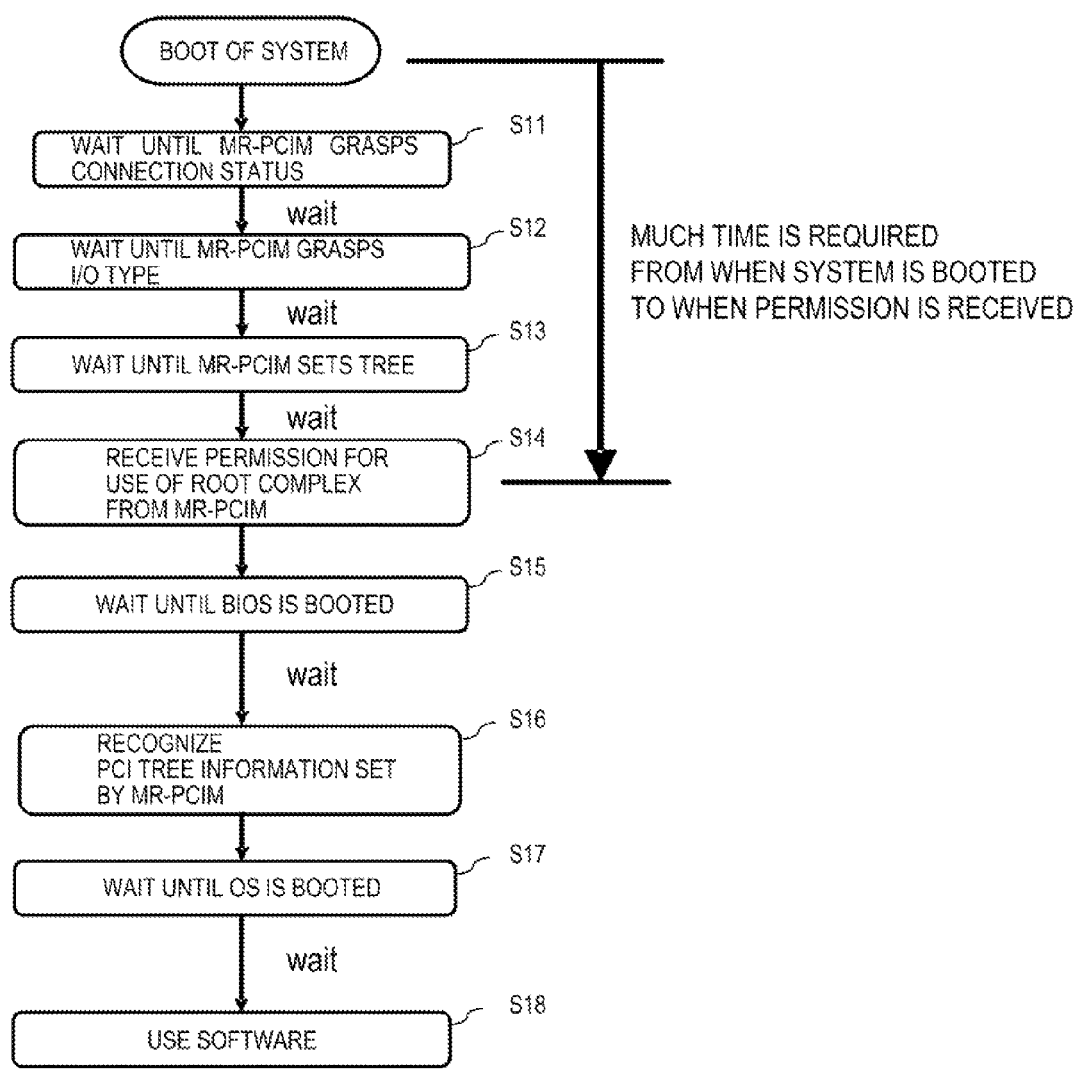
FIG. 9 illustrates a problem with an operation sequence of a root complex.

FIG. 19 illustrates portions deleted from the PCI tree. The shaded areas are portions determined to be unnecessary in the PCI tree, based on the settings of the VH/VS numbers. The hot plug event issuing unit 823 hot-removes (separates) these areas, to configure a PCI tree identical to a real PCI tree. Further, the virtual PCI-PCI bridges and virtual bridges are changed to real PCI-PCI bridges and real I/Os through hot-remove (separation) and hot-add (addition) processes while being maintained in the form of a PCI tree. Thus, a configuration identical to that illustrated in FIG. 6 is obtained.

Thus, since the time-consuming processes of grasping the physical connection status and I/O types, which are problems with conventional MRA PCI express switches, are executed by effectively using the time during which the root complex boots the BIOS and the OS, the system boot time is shortened. In addition, a user can use software based on a PCI tree identical to that used in a conventional system.

As described above, according to an exemplary embodiment of the present invention, for example, as illustrated in FIGS. 12 and 13, a multi-root PCI express switch (9511, 9512) connectable to a plurality of root complexes (102, 109, 1021) includes: a setting register (95121, 95131) storing necessary information for setting a PCI tree based on a switch connection topology and a physical connection status; and a virtual switch bridge controller 81 storing necessary information for establishing a virtual PCI tree, irrespective of a status of the setting register.

Since the above multi-root PCI express switch includes the virtual switch bridge controller 81 storing necessary information for establishing a virtual PCI tree, even before the setting register is set, a root complex can be booted without having to wait until the connection topology or the physical connection status is grasped. Further, irrespective of the system scale, the time required until the root complex is booted can be made constant.

In addition, according to an exemplary embodiment of the present invention, for example, as illustrated in FIGS. 12 and 13, a multi-root PCI express switch may further include: a multi-root aware PCI-PCI bridge (5113, 5133) connectable to the plurality of root complexes; and a virtual PCI express switch (5116, 5117, 5118, 5119, 5126, 5127, 5129) arranged to correspond to the plurality of root complexes (102, 109, 1021) and connecting a plurality of bridges (5111, 5112, 5122, 5113, 5114, 5115, 5123, 5124, 5133) including the multi-root aware PCI-PCI bridge (5113, 5133).

In addition, according to an exemplary embodiment of the present invention, for example, as illustrated in FIGS. 16 and 17, a boot method of a multi-root PCI express switch (9511, 9512 in FIG. 11) connected to a plurality of root complexes (102, 109, 1021 in FIG. 11) includes: a step (S21, S22) of setting, when a system is booted, necessary information for establishing a virtual PCI tree based on information about the number of switches included in the system and the number of links of the switches in the multi-root PCI express switch; a step (S33) of booting a BIOS system based on the set information and establishing a virtual PCI tree; and a step (S36 to S39) of checking a connection topology of the switch to check a connection status and replacing the virtual PCI tree with a real PCI tree.

According to the above boot method, when a system is booted, a PCI tree (see FIG. 18) is virtually established. Thus, a BIOS system can be booted in a short time. In addition, since the virtually established PCI tree (FIG. 18) is replaced with a real PCI tree (see FIG. 19) after a connection topology and a connection status are checked, no discrepancy is caused.

In addition, according to an exemplary embodiment of the present invention, as illustrated in FIG. 16, a multi-root PCI manager program causes a computer (101 in FIG. 11) to manage a multi-root PCI express switch (9511, 9512 in FIG. 11) connected to a plurality of root complexes (102, 109, 1021 in FIG. 11). The program includes: a step (S21, S22) of setting, when a system is booted, necessary information for establishing a virtual PCI tree (FIG. 18, for example) based on information about the number of switches included in the multi-root PCI express switch (9511, 9512) and the number of links of the switches in the multi-root PCI express switch (9511, 9512 in FIG. 11); a step (S23) of giving a permission for use of the multi-root PCI express switch to the root complexes (102, 109, 1021) based on the set information; and a step (S24 to S26) of checking a connection topology and a physical connection status of the multi-root PCI express switch and setting necessary information for establishing a real PCI tree in the multi-root PCI express switch.

The above multi-root PCI manager program can be installed in a computer via a storage medium such as a CDROM, a DVD, a flexible disk, a ROM, a flash memory, a RAM, or a hard disk. In addition, the computer can execute the multi-root PCI manager program stored in the storage medium.

When a system is booted, the above multi-root PCI manager simply refers to a switch register to grasp information about the number of switches and the number of links of the switches, and based on the information, the multi-root PCI manager sets necessary information for establishing a virtual PCI tree in a multi-root PCI express switch. Based on the information, the multi-root PCI manager gives permission for use of the multi-root PCI express switch to root complexes. Thus, the root complexes can be quickly booted, irrespective of the system scale. After a switch connection topology and a physical connection status are checked, the information set for establishing a virtual PCI tree is set to necessary information for establishing a real PCI tree. Namely, since the virtual PCI tree can be updated to a real PCI tree through a hot plug process or the like, no discrepancy is caused.

According to the present invention, based on an MRA PCI express switch accommodating a plurality of root complexes, the MR-PCIM can quickly boot the root complexes before grasping physical and logical configurations. Thus, the system boot time can be shortened. This is because the MRA PCI express switch additionally includes a virtual switch bridge controller allowing the root complexes to view multi-stage virtual switches and virtual bridges. When the system of a root complex is booted, first, the root complex is allowed to use the multi-stage virtual switches and bridges. In this way, the MR-PCIM can quickly allow the root complex to be booted.

In addition, based on an MRA PCI express system according to the present invention, immediately after the MR-PCIM is booted, at a certain timing, the MR-PCIM can quickly allow the root complexes to be booted, irrespective of the system scale. Thus, reset and power supply management control on the root complexes can be simplified. This is because the multi-root PCI express switch additionally includes a virtual switch bridge controller allowing the root complexes to view multi-stage virtual switches and virtual bridges. When the system of a root complex is booted, first, the root complex is allowed to use the multi-stage virtual switches and bridges. In this way, the MR-PCIM can quickly allow the root complex to be booted.

While the present invention has thus been described based on examples, the present invention is not limited to the configurations of the examples. The present invention of course includes various variations and modifications that could be made by those skilled in the art within the scope of the present invention.

Industrial Applicability

Computer systems and network systems linked via wired connections have been described in the examples to which the present invention is applicable. However, the present invention is not limited to such examples. The present invention is applicable to any system environment including a PCI express interface.

It should be noted that other objects, features and aspects of the present invention will become apparent in the entire disclosure and that modifications may be done without departing the gist and scope of the present invention as disclosed herein and claimed as appended herewith.

Also it should be noted that any combination or selection of the disclosed and/or claimed elements, matters and/or items may fall under the modification aforementioned.

What is claimed is:

1. A multi-root PCI express switch connectable to a plurality of root complexes comprising:

a setting register storing necessary information to set a PCI tree based on a switch connection topology and a physical connection status;

a virtual switch bridge controller storing necessary information to establish a virtual PCI tree, irrespective of a status of the setting register; and a real configuration register storing address information necessary when transferring data, wherein the virtual switch bridge controller comprises a PCI switch bridge virtual configuration register set based on information regarding the number of switches included in a system and the number of links of the switches, wherein the virtual switch bridge controller further comprises a virtual register synchronization controller executing synchronous control on the PCI switch bridge virtual configuration register and the real configuration register based on settings of the setting register.

2. A boot method of a multi-root PCI express switch connected to a plurality of root complexes, the boot method comprising:

when a system is booted, setting necessary information to establish a virtual PCI tree based on information regarding the number of switches included in the system and the number of links of the switches in the multi-root PCI express switch;

booting a BIOS system based on the set information and establishing a virtual PCI tree; and checking a connection topology of the switch to check a connection status and replacing the virtual PCI tree with a real PCI tree, wherein, when the system is booted, a multi-root PCI manager program of a host computer sets necessary information to establish a virtual PCI tree based on information regarding the number of switches included in the system and the number of links of the switches in the multi-root PCI express switch, wherein the root complexes boot a BIOS system and establish the virtual PCI tree, wherein, after checking the connection topology and the connection status, the multi-root PCI manager program sets necessary information to establish a real PCI tree in the multi-root PCI express switch, wherein the root complexes replace the virtual PCI tree with a real PCI tree, based on the information set to establish the real PCI tree, wherein the multi-root PCI manager program grasps the number of switches configuring the system and the number of links of the switches by referring to a register in the multi-root PCI express switch, sets necessary information to establish a virtual PCI tree, allocates fixed VH (virtual hierarchy) numbers to root complexes connected to the host computer, and gives a permission for use of the switch to the root complexes connected to the host computer, wherein, in response to the permission, the root complexes that have received the permission boot the BIOS system and establish a virtual PCI tree, wherein the multi-root PCI manager program checks the connection topology to grasp a physical connection status in parallel with the processes executed by the root complexes and determines whether any I/Os are connected, and wherein, if any I/Os are connected, the multi-root PCI manager program grasps types of the I/Os.

3. The boot method of the multi-root PCI express switch according to claim 2, wherein the multi-root PCI manager program grasps the physical connection status and the types of the I/Os, and wherein the multi-root PCI express switch issues a hot plug event depending on the setting and causes the root complexes to match the virtual PCI tree and the real PCI tree.

4. The multi-root PCI express switch according to claim 1, wherein the virtual switch bridge controller further comprises a hot plug event issuing unit issuing a hot plug event to match the virtual PCI tree to a real PCI tree based on a setting state of the multi-root PCI express.

5. A boot method of a multi-root PCI express switch connected to a plurality of root complexes, the boot method comprising:

when a system is booted, setting necessary information to establish a virtual PCI tree based on information regarding the number of switches included in the system and the number of links of the switches in the multi-root PCI express switch;

booting a BIOS system based on the set information and establishing a virtual PCI tree; and checking a connection topology of the switch to check a connection status and replacing the virtual PCI tree with a real PCI tree, wherein the multi-root PCI express switch comprises a virtual switch bridge controller storing information regarding the virtual PCI tree and replacing the virtual PCI tree with a real PCI tree, wherein, when the system is booted, a multi-root PCI manager program of a host computer sets necessary information to establish a virtual PCI tree based on information regarding the number of switches included in the system and the number of links of the switches in the multi-root PCI express switch, wherein the root complexes boot a BIOS system and establish the virtual PCI tree, wherein, after checking the connection topology and the connection status, the multi-root PCI manager program sets necessary information to establish a real PCI tree in the multi-root PCI express switch, wherein the root complexes replace the virtual PCI tree with a real PCI tree, based on the information set to establish the real PCI tree, wherein the multi-root PCI manager program grasps the number of switches configuring the system and the number of links of the switches by referring to a register in the multi-root PCI express switch, sets necessary information to establish a virtual PCI tree, allocates fixed VH (virtual hierarchy) numbers to root complexes connected to the host computer, and gives a permission for use of the switch to the root complexes connected to the host computer, wherein, in response to the permission, the root complexes that have received the permission boot the BIOS system and establish a virtual PCI tree, wherein the multi-root PCI manager program checks the connection topology to grasp a physical connection status in parallel with the processes executed by the root complexes and determines whether any I/Os are connected, and wherein, if any I/Os are connected, the multi-root PCI manager program grasps types of the I/Os.

6. The boot method of the multi-root PCI express switch according to claim 5, wherein the multi-root PCI manager program grasps the physical connection status and the types of the I/Os, and wherein the multi-root PCI express switch issues a hot plug event depending on the setting and causes the root complexes to match the virtual PCI tree and the real PCI tree.

* * * * *